June 13, 1950 L. N. YOHE 2,511,314
APPARATUS FOR FREEZING DESERTS
Filed Aug. 13, 1946 4 Sheets-Sheet 1
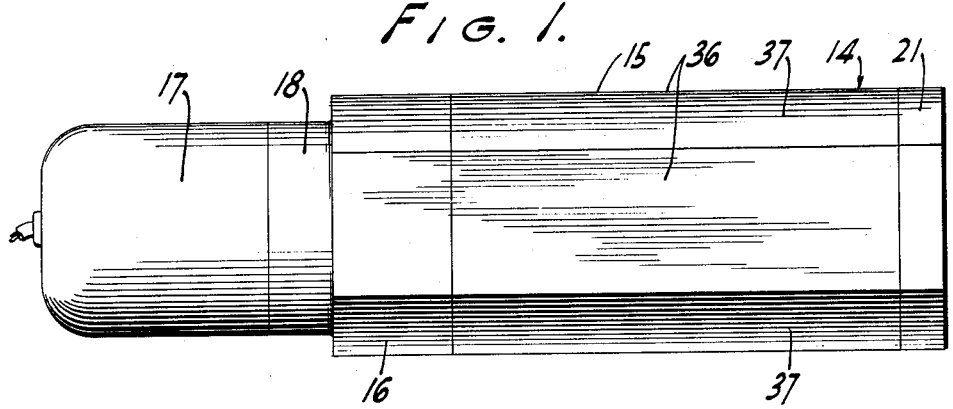
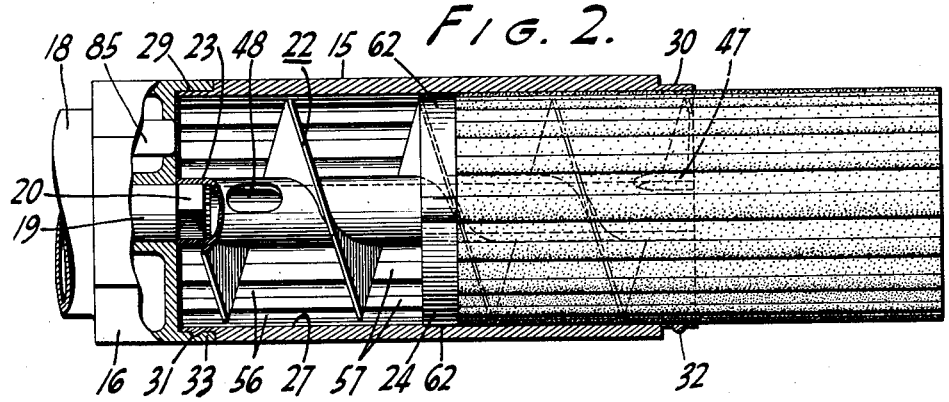
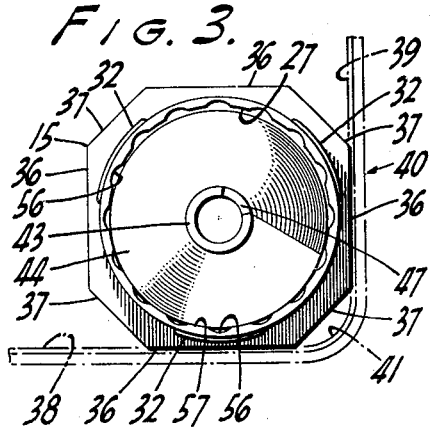 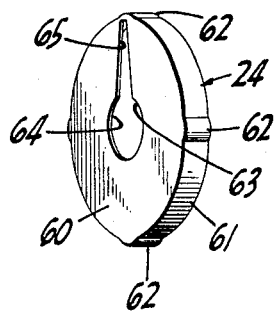
INVENTOR.
LESTER N. YOHE
BY
ATTORNEYS June 13, 1950　　　　　L. N. YOHE　　　　　2,511,314
APPARATUS FOR FREEZING DESERTS
Filed Aug. 13, 1946　　　　　　　　　　4 Sheets-Sheet 2

INVENTOR.
LESTER N. YOHE
BY
Lancaster, Allwine and Rommel
ATTORNEYS

June 13, 1950 L. N. YOHE 2,511,314
APPARATUS FOR FREEZING DESERTS
Filed Aug. 13, 1946 4 Sheets-Sheet 4
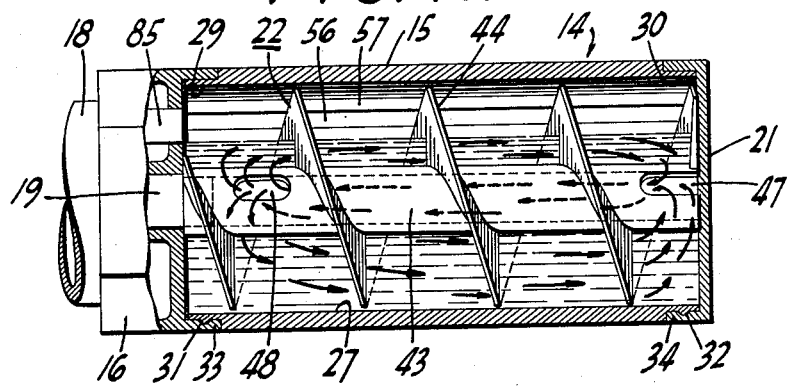
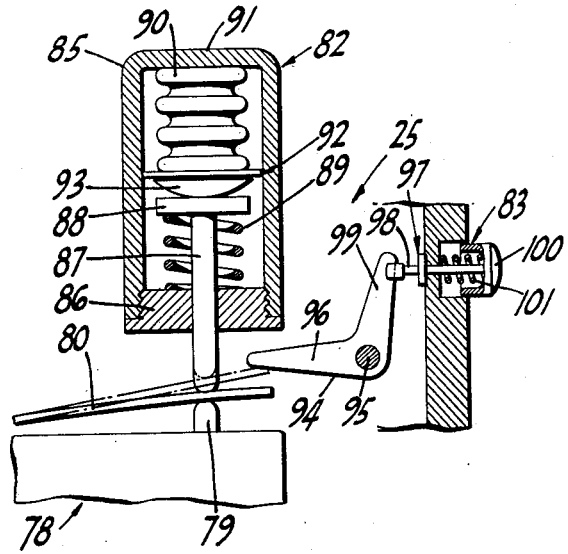
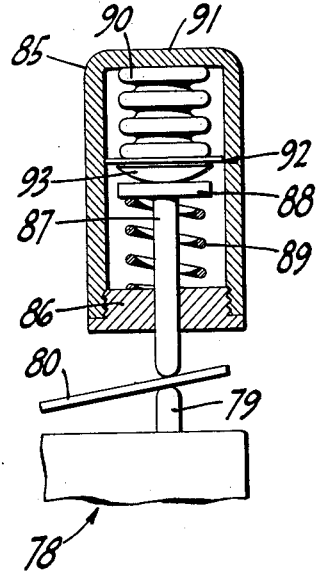
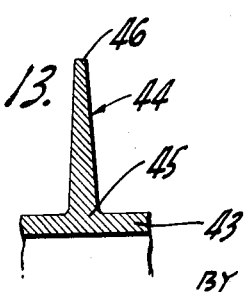
INVENTOR.
LESTER N. YOHE
BY
Lancaster, Allwine and Rommel
ATTORNEYS Patented June 13, 1950

2,511,314

UNITED STATES PATENT OFFICE 2,511,314

APPARATUS FOR FREEZING DESSERTS

Lester N. Yohe, Upper Darby, Pa.

Application August 13, 1946, Serial No. 690,145

8 Claims. (Cl. 62—114)

This invention relates to apparatus for freezing desserts or other edible mixtures, such as ice cream. The apparatus is particularly well adapted, but not necessarily limited to home use, and is an improvement on the apparatus disclosed in my copending application for patent filed July 9, 1945, Serial No. 603,965.

In the copending application is disclosed apparatus electrically and thermostatically operated, adapted for use in the freezing compartments of mechanical refrigerators, having many desirable characteristics, among which may be mentioned control, not requiring the attendance of a person to break the electric circuit used in operating the agitator when the mix has reached the desired temperature; ability to mechanically express the frozen mix from the freezer container by use of an electric motor, also used to operate the agitator, in contradistinction to scooping or otherwise manually removing it; and, the inclusion of an agitator capable of so circulating the mix in liquid form, and after it becomes a semisolid, as to require less time to provide a frozen edible, and of more desirable texture, than where agitators of the conventional or slightly modified forms thereof are used.

While very satisfactory results were obtained by use of the apparatus disclosed in my said copending application, especially when the mix contained considerable cream, it was found that considerable time was required to attain the desired frozen consistency, altho this was accomplished in less time than using other equipment then available on the market. Also the mix, rich in cream, when frozen, had a tendency to revolve in the container, with the agitator, instead of being uniformally expressed therefrom when the end cap at the exit end of the container was removed. As to edibles made from ingredients lower in cost than cream, it was found that a longer period of operation was necessary, and there was a tendency toward crystallization, altho not as much as when desserts are made in ice trays with little or no agitation, or where the conventional dasher or agitator is used.

The present invention has for one of its principal objects the provision of an ice cream freezer which will be quick and efficient in operation, to produce frozen desserts of the character using inexpensive engredients, as well as those containing cream. This is in part accomplished by rapid heat transfer from the container and mix to the evaporator or other heat transfer medium, and by control of the path taken by the mix when circulated by the improved agitator.

Another object of the invention is to guard against sluggish exit of the frozen mix from the container when expressed by use of the electric motor used initially to operate the agitator, regardless of the creamy nature of the frozen mix. This is primarily accomplished by keying, so to speak, the outer zone of the frozen mix against circumferential movement in the bore of the container while the agitator operates to express the frozen mix from the open end of the container.

A further object is to provide an auxiliary feed device or scraper which may be brought into use if desired to clear the agitator and container of a very hard frozen mix, or one rich in cream, as it is expressed from the container, so as to leave no material portion of the batch in the container or on the agitator when preparing to serve, and which feed device or scraper may also be used to clear the agitator of the frozen mix if it is desired to store the latter in the main body portion of the container, without leaving the agitator in place. This makes possible the use of the main body portion of the container as a storage vessel while the agitator and a motor carried end cap, such as is shown in my copending application may be used with another container body and exit end cap for the freezing of another batch.

Another object of the invention is to provide an agitator whereby the desired build-up of the mix may be accomplished by a simple adjustment of an element thereof.

By the use of the term "build-up," reference is had to the building up or growth of the mix from liquid form, to one of semisolid form and of greater bulk. The present invention makes possible adjustments whereby this build-up may be either to a product of somewhat heavy semisolid form (with some growth in bulk over the bulk of the mix in liquid form) or ranging to a product of light or fluffy semisolid form (with greatly increased growth in bulk over the bulk of the mix in liquid form). This is accomplished by providing either a somewhat free path for circulation of the mix, as the agitator operates, resulting in a somewhat heavy semisolid, of the character described, or by restricting the mix at a portion of its path of circulation so that its velocity is increased when issuing from such restriction, and at which time air is entrained in the mix, resulting a lighter semisolid of greatly increased bulk. This restriction may be varied to provide an edible product having the desired build-up or texture.

Another object of the invention is to simplify the construction of the freezer, avoiding the provision of one of the bearings shown in my copending application and thereby increasing the capacity of the container, leaving no appreciable zone in which the mix will not be circulated, for inactive mix during freezing has a tendency to crystallize.

Other objects and advantages of the invention will appear in the following detailed description, taken in connection with the accompanying drawings, forming a part of this specification and in which drawings—

Fig. 1 is a side elevation of the ice cream freezer.

Fig. 2 is a fragmentary view of the freezer partly in elevation and partly in longitudinal section, the view showing one of the end caps of the freezer container having been removed and the charge or slug of frozen mix being expressed from the container.

Fig. 3 is a view in end elevation of the freezer looking toward the egress end of the container with its cap removed, exposing the end of the agitator to view; the dot and dash lines illustrating a portion of an evaporator of a mechanical refrigerator.

Fig. 4 is a perspective view of an auxiliary feed device which may be used to assist in expressing the frozen edible from the container.

Fig. 10 is a view partly in side elevation and partly in longitudinal section of the freezer showing a liquid mix therein and indicating by arrows the path of travel of the mix resulting from rotation of the agitator.

Fig. 11 is a detail view of a portion of an electric switch in elevation and mechanism in elevation and section, associated therewith, for automatically (thermostatically) and manually operating the switch, the full line showing being of parts when the agitator motor circuit has been completed automatically and the dot and dash line representation showing an "off" position of an element of the switch.

Fig. 12 is a view similar to Fig. 11 but showing the relative position of parts when the agitator motor switch has broken the electric circuit due to the latent heat having been removed from the mix.

Figure 5:
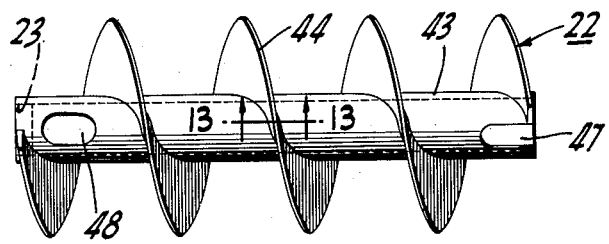
Fig. 5 is a side elevation of one form of agitator which may be used as a part of the freezer, in which a central tube is cast or formed integral with a helical blade.

Fig. 13 is an enlarged detail view in section on the line 13—13 of Fig. 5, showing the preferred cross section of the helical blade and its juncture with the tube of the agitator.

Figure 6:
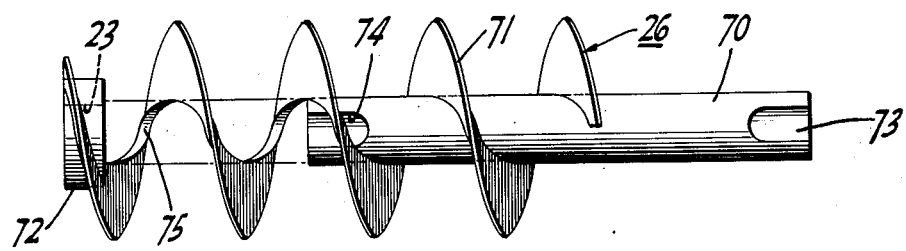
Fig. 6 is a side elevation of a modified form of agitator in which a central tube is removable from a helical blade and coupling member thereof, the view showing the tube partially removed.
Figure 7:
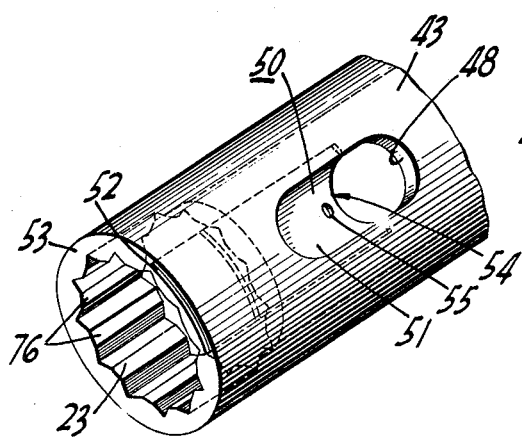
Fig. 7 is an enlarged, fragmentary view, in perspective, of the end portion of the tube portion forming a part of the agitator shown in Fig. 5, certain characteristics of which are also applicable to the tube shown in Fig. 6.

Generally speaking, the freezer comprises a container 14 including an elongated body portion 15, a head cap 16 carrying an electric motor 17 and a housing 18 for speed reducing gearing (not shown in the drawing), which may be like that disclosed in my aforesaid copending application Serial No. 603,965 for rotating a drive shaft 19 and a polygonal coupling element 20, and a rear cap 21; an agitator 22 in the container including a companion coupling element 23 for detachable engagement with the coupling element 20; an auxiliary feeding device or scraper 24 for cooperation with the container 14 and agitator 22; and a thermostatic and manual control 25 for the electric circuit of motor 17, which may be mainly accommodated in the housing 18. A modified form agitator 26 is shown in Fig. 6.

The container 14 may be made of any suitable heat conducting material and the body 15 is provided with a bore 27 preferably extending from end to end thereof. The ends of body 15 may be provided with reduced cylindrical and portions 29 and 30, equipped with interrupted threads 31 and 32 for cooperation with similar threads 33 and 34 on the caps 16 and 21, respectively. By this arrangement either cap may be placed on or removed from the body 15 by only a partial turn imparted to the cap.

The container body portion 14 may be made polygonal, and is preferably octagonal in cross section as shown by Figs. 1 and 3, so as to provide flat faces any one of which may rest upon a flat surface in a manner to prevent the container from rolling therefrom. It is preferred to have each alternate face 36 wider than intermediate narrower faces 37 so that any two adjacent faces 36 may engage, with intimate contact a bottom 38 and a wall 39 of an evaporator chamber 40 of a mechanical refrigerator as indicated by dot and dash lines in Fig. 3, for rapid heat exchange between the freezer and heat exchange medium. The narrower face 37 between the wider faces 36 in contact with the evaporator, enables the user to clear the usual curved portion 41 of the evaporator, joining the bottom and wall of the evaporator.

The form of agitator shown in Figs. 2, 3, 5, 7 and 9 comprises a central tube 43 formed integral with a helical blade 44. The one end of the tube is provided with the companion coupling element 23 for coupling element 20. It is preferred to make the helical blade 44 tapered in cross section, shown more in detail in Fig. 13, widest at its root 45 and with its free edge 46 in close proximity to or for engagement with a portion of the bore 27 of the container 14 as hereinafter described. The tube 43 is of a length substantially equal to the distance between the caps 16 and 21 and adjacent the cap 21 is provided with an inlet port 47 and adjacent the cap 16 with an outlet port 48. As shown more in detail in Fig. 7, the tube 43 is preferably provided with means 50 for varying the size of outlet port 48. This may be a valve plate 51 arcuate in cross section, slidable in an arcuate slot 52 open to port 48 and to the end 53 of the tube. This plate may have an arcuate recess 54 at its inner end, and a perforation 55 adjacent thereto, the perforation to receive any suitable tool (not shown in the drawing) to facilitate adjustment of the valve plate.

The bore 27 of the container is provided with a plurality of preferably widely spaced, parallel, shallow furrows 56 extending longitudinally of the bore 27, leaving lands 57 therebetween. The furrows and lands have various purposes among which may be mentioned the function of the walls of the furrows to prevent or resist circumferential movement of the semisolid mix (especially when such is somewhat unctuous, i. e., containing considerable cream), while being expressed from the container by use of the revolving agitator, portions of the frozen mix, acting like keys in the furrows as shown in Fig. 2; the function of the walls of the furrows to guide and prevent rotation of the auxiliary feeding device 24 as it moves toward the exit end of the container; and, the function of the wide lands to provide a smooth surface for engagement with the agitator when not held therefrom by the auxiliary feeding device, and to present considerabl metallic surface for heat exchange at the zone adjacent the outer edge of the helical blade of the agitator 22.

While there may be materials other than metal from which the main body portion of the container may be made, and it has been found that some molded plastics are not good heat exchanging materials, so are not recommended, it is believed the best results are obtained if the container body is cast from metal, the bore machined free of pits and imperfections, and the furrows also machined so as to provide the lands concave transversally of the container. In this way the helical blade of the agitator may engage the lands at the lowermost portion of the container and also sweep in close proximity to the concave other lands above those which are lowermost. This is in contradistinction to the mere molding of ribs at the inner circumference or bore of the container body. The provision of a container comprising an elongated body portion and removable end caps facilitates this machining of the lands and furrows, since they may extend from end to end of the bore of the body portion as shown in Fig. 2.

By way of example, the auxiliary feeding device or scraper 24 may comprise a disk-like body portion 60 of a diameter substantially equal to the diameter of bore 27 and an annular flange 61 extending from one face thereof, the flange being provided with radial projections or lugs 62 for engagement in selected furrows 56 of the body 15, so as to prevent circumferential movement of the device in the container 14 altho permitting it to slide longitudinally therein. The disk-like body portion 60 is provided with a keyhole slot 63, the circular portion 64 to engage about the tube 43 and the lateral portion 65 to receive the helical blade 44 with intimate contact therewith. The device or scraper 24 may be brought into use to assist in forcing the frozen dessert from the body 15, as shown in Fig. 2, by first removing the front cap 16 and placing the device or scraper in the body 15 in operative relation to the tube 43, blade 44 and furrows 56. The cap 16 may then be replaced and the motor 17 used in a manner similar to the arrangement shown in my copending application Serial No. 603,965 to rotate the agitator 22 and hence carry the device or scraper 24 to the exit end of the body 15, after the rear cap 21 has been removed.

The auxiliary feeding device or scraper 24 shown in Figs. 2 and 4 may also be used, if desired, to assist in removing the agitator 22 from the frozen mix as soon as agitation ceases or at any time thereafter while the mix is in a custard or semisolid condition. This may be accomplished by leaving the rear end cap 21 in place and removing the front cap 16 from the container body 15, followed by dropping the feeding device into operative relation to the agitator and container body, assuming the container is standing on end with the rear cap lowermost, and finally rotating the agitator by hand. This causes the feeding device to be drawn down into the container body and as soon as it is drawn securely against mix in custard or frozen form, the agitator climbs, so to speak, out of the frozen mix by exerting a thrust on the feeding device. As a result, the agitator is scraped free of the frozen mix. If desired a suitable cap (not shown in the drawing) similar to the rear end cap may then be placed on the end of the container body at its top end and the container with its contents, placed in the refrigerator for later use, after its temperature has been further lowered. The drive or head cap and agitator may be used with another container body and rear end cap for the purpose of freezing another mix.

It will be noted from Fig. 10, that the helical blade 44 also extends substantially from cap 16 to cap 21 so there is no material portion of the container inwardly of the caps and body portion 15 where the frozen mix remains inert as the agitator rotates. The mix is circulated by the blade to the end of container closed by cap 21 and if the container is placed horizontal in the evaporator it causes the mix to move initially along the bottom of body portion 15. It then finds its way thru inlet port 47 to the interior of tube 43 where its velocity is increased, and finally, in a cycle of circulation, finds exit thru the outlet port 48 where it issues with considerable force, aerating the mix. By regulating the size of the outlet port, the degree of aeration may be controlled. This arrangement enables me to make excellent desserts from comparatively inexpensive ingredients, as well as from such containing considerable cream. The smaller the effective outlet port opening, the greater is the build-up of the mix; the larger the effective outlet opening of the port the smaller the build-up.

The modified form of agitator 26 shown in Fig. 6 comprises a central tube 70 and a separate helical blade 71, provided with a coupling element 72 at one end portion for cooperation with the coupling element 20. The tube 70 is provided with an inlet port 73 and an outlet port 74 functioning like the ports 47 and 48. The operation of this form of agitator is like the agitator 22 and the parts may be readily separated for cleansing. The tendency of the helical blade (which has a bore 75 of a diameter substantially equal to the external diameter of the tube 70), when rotated thru the coupling element 72, is to grip the tube firmly and cause it to rotate with the blade, especially when the blade encounters, during its rotation, the mix within the container. The coupling elements 23 and 72 may be provided with a plurality of splines 76 shown in Fig. 7, for engagement with the polygonal coupling element 20. The fit of these coupling elements is sufficiently loose to enable the agitator blade to engage upon the lowermost lands 57 as shown in Figs. 3 and 10, thus avoiding the necessity for close tolerance between the blade and interior of the body 15.

The control 25 is shown by way of example, as suitable means to not only render the making of the frozen dessert automatic, in that an attendant is not required to start and stop the motor, but also to produce uniform products from the same mix made at different times—something which is difficult if an attendant must precool or reduce the temperature without agitation and manually start the motor for extracting the latent heat at approximately 32 degrees F. It has been found that if a mix, particularly high in cream content, is agitated while at room temperature, and in fact until it has been precooled to a temperature approaching freezing, butter is formed, and it is practically impossible for an individual to determine the optimum moment to start agitation. In my copending application Serial No. 603,965, manual starting of the motor is contemplated, but according to the present invention automatic starting, when the mix has attained an optimum temperature, is preferred. It has also been found that even with mixes containing ingredients less expensive than cream, a better quality of product is obtained if the mix is inert during the precooling period or until just prior to its reaching a freezing temperature. This also reduces the time of freezing and agitation.

Figure 9:
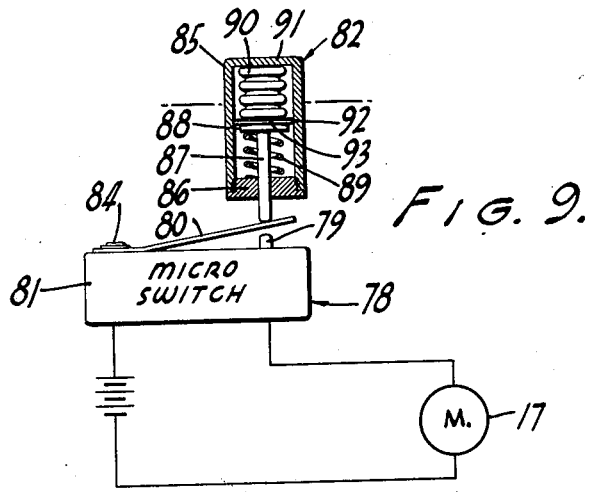
Fig. 9 is a view partly in elevation and partly in section, and showing an electrical wiring diagram for control of periods of operation of the agitator of the freezer whereby the time-temperature operation shown in Fig. 8 may be accomplished.

The control 25 includes, in the example shown, an electric switch 78 of the character shown in my copending application Serial No. 603,965, generally known as a "Micro" switch, shown more in detail in United States patent to McGall, No. 1,960,020 granted May 22, 1934. Such switch includes a plunger 79 which, when depressed, closes the electric circuit of the motor 17, the switch as shown in Figs. 9 and 11 being "open" and in Fig. 10 "closed." The control 25 also includes an arm 80 mounted on the switch body 81 for engagement with plunger 79, a thermostatic means 82 acting upon the arm 80 to render the switch 78 "closed" during a certain temperature range adjacent the thermostatic means 82, and a manually operable mechanism 83 for action upon the arm 80 when it is desired to render the switch "closed" at a time when the ambient temperature of the thermostatic means 82 is not in said range; for example when it is desired to express the frozen mix from the container by use of the motor and agitator.

The arm 80 may be of spring metal, secured to body 81 by a rivet 84, the inherent tendency of the arm being to move away from the plunger 79.

To some extent the thermostatic means 82 resembles that disclosed in my aforesaid copending application in that it comprises a cup like housing 85 (shown in Figs. 2 and 10, but more in detail in Figs. 8, 11 and 12) having a removable closure 86 thru which extends a plunger 87, for engagement with arm 80, and having at inner end a head 88 slidable in the housing 85; a spring 89 interposed between the closure 86 and head 88 for normally retracting the plunger 87; and a thermostatic unit 90 including an elastic sack or bellows abutting against the solid end 91 of housing 85, and containing a liquid or gaseous substance, such as alcohol or a suitable hydrocarbon (not shown in the drawing) capable of contracting during change from high to low temperature. However, in the example here shown there is interposed between the sack or bellows 90, and plunger head 88, a thermostatic, bimetallic disk unit 92 in which a high expanding metal portion 93 is preferably placed to engage the plunger head 88, and snaps or warps to a concave-convex condition as shown in Figs. 11 and 12 when subjected to a predetermined range, such as between 38° to 34° F.

Figure 8:
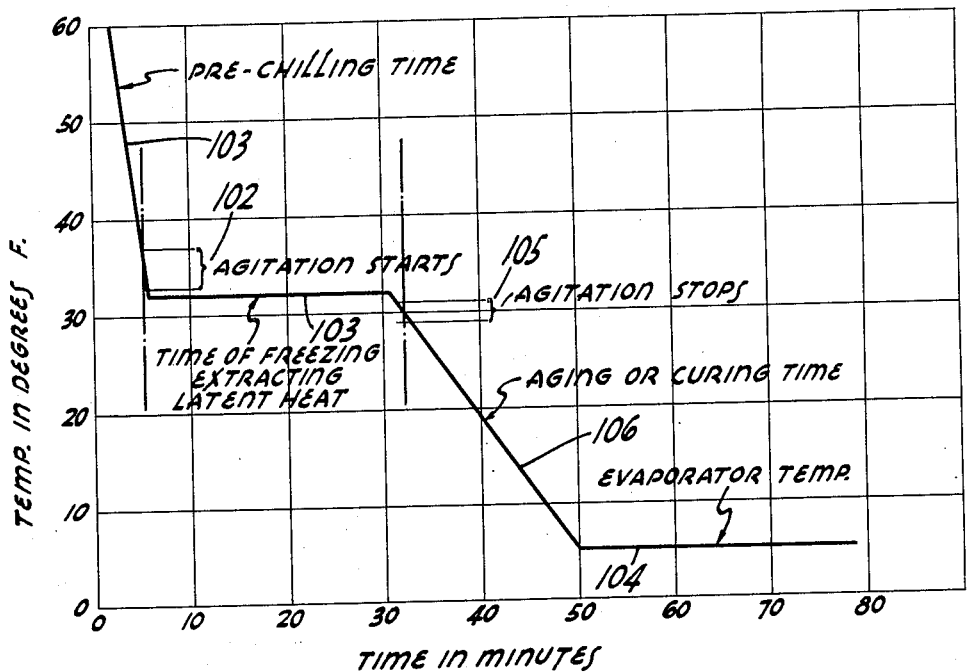
Fig. 8 is a chart showing a graphic analysis of time-temperature operation of a freezer constructed according to the present invention.

The effect of cold upon the thermostatic unit 90 is to cause it to contract, and conversely the effect of heat is to cause it to expand as in the aforesaid copending application, but in the present invention, when expanded to room temperature it does not close the switch 78 since the thermostatic bimetallic disk unit 92 is contracted or unwarped at room temperature and the spring 89 yieldably retracts the plunger 87 to the position shown in Fig. 8. The thermostatic bimetallic disc unit is heat treated after forming so that the maximum throw is obtained at the 38° to 34° F. region, and when reaching the maximum throw it is sufficient to overcome the expansive action of spring 89 and cause the plunger 87, and arm 80 to depress the switch plunger 79, as shown in Fig. 11, closing the switch 78 and hence the circuit of motor 17. However as the thermostatic unit 90 continues to contract, due to the lowering temperature it finally permits the spring 89 to retract the plunger 87 to a position where the pressure on the switch plunger 79 is relieved to the extent that the switch 78 snaps to an "open" position as indicated in Fig. 12, breaking the circuit of motor 17. The thermostatic unit 90, thermostatic bimetallic disc unit 92, plunger 87, arm 80 and plunger 79 are so constructed and arranged that when the ambient temperature of thermostatic unit 90 is within the range of approximately 31° to 28° F., the effective length of the elastic sack or bellows of the thermostatic unit 90 will be reduced to the extent that the plunger 79 will be free to move to a position permitting the switch to operate to an "off" condition.

The manually operable mechanism 83, as shown in Fig. 11, comprises a bell crank lever 94 pivoted as at 95, with one arm 96 normally engaging the arm 80 when switch 78 is "open"; a plunger 97, a stem 98 of which engages the other arm 99 of the bell crank lever, and a head 100 of which is exposed exteriorly of the freezer; and an expansion spring 101 arranged to normally project the head 100 and yieldably restrain the bell crank lever 94 from depressing the plunger 79 thru arm 80. Thus when pressure is manually brought upon the head 100, the bell crank lever is moved from the position shown in Fig. 11, and if the arm 80 is in engagement with the arm 96, as indicated by dot and dash lines in Fig. 11, the switch 78 will be manually closed.

While it is believed the operation of the apparatus will be clear from the foregoing description, reference may be had to Fig. 8 more particularly in connection with the preferred time-temperature operation thereof. As there graphically illustrated, the mix is chilled, while inert, from room temperature, without agitation, until a predetermined temperature in zone 102 is reached. By doing this a large proportion of the sensible heat 103 of the mix is removed. If the mix is high in butter fat, this method prevents butter from being formed. It also reduces the time of freezing and agitation. When the zone 102 is reached and the agitator is started into action, as by the thermostatic bimetallic disc unit 93 closing the switch 78, the mix is agitated and this agitation continues until the latent heat 103 is extracted, after which the cooling medium shown at temperature 104, removes more sensible heat from the frozen dessert. The temperature drops to zone 105 at which agitation is discontinued, as by the thermostatic unit 90 contracting sufficiently to permit the switch 78 to operate to an "off" condition, breaking the circuit of motor 17, and the frozen dessert remains inert for aging or curing during which the temperature 106 drops and the frozen dessert is cooled until the temperature 104 of the refrigerant is reached.

I claim:

1. In a freezer unit, the combination of an elongated container provided with a longitudinally extending bore; and an agitator in said bore comprising an axially located tubular portion provided with an inlet port and an outlet port at opposite end portions, a helical blade surrounding said tubular portion; and a device to vary the size of said outlet port.

2. As an article of manufacture, an agitator for freezers comprising a tube, provided with an inlet port in the side wall thereof adjacent to one end portion and an outlet port in the side wall thereof adjacent to the other end portion thereof, and a helical blade surrounding and formed integral with said tube.

3. As an article of manufacture, an agitator for freezers comprising a tube, provided with an inlet port in the side wall thereof adjacent to one end portion and an outlet port in the side wall thereof adjacent to the other end portion thereof, and a helical blade surrounding and formed integral with said tube, said blade being of tapered cross section with its wider portion at its root joining the blade with the tube.

4. As an article of manufacture, an agitator for freezers comprising a tube provided with an inlet port in the side wall thereof adjacent to one end portion and an outlet port in the side wall thereof adjacent to the other end portion thereof, and a helical blade provided with a coupling part at one end portion to facilitate rotation of the blade, said helical blade surrounding and detachably engaging the external periphery of the tube to rotate the latter upon rotation of the blade.

5. As an article of manufacture, an agitator for freezers comprising a tube provided with an inlet port at one end portion and an outlet port at the other end portion thereof, and helical blade provided with a coupling part at one end portion to facilitate rotation of the blade, said helical blade surrounding and detachably engaging the external periphery of the tube to rotate the latter upon rotation of the blade, and said helical blade being of tapered cross section wider at its root than at its free edge.

6. In a freezer unit, the combination of an elongated container provided with a longitudinally extending bore, a head cap at one end portion thereof provided with a rotatable coupling element and a detachable rear cap at the other end portion thereof; and a helical agitator rotatable in said bore, extending from said head cap to said rear cap and including a companion coupling element for said first mentioned coupling element, said coupling element constructed and arranged to permit said helical agitator to engage by gravity the lowermost portion of said bore when the container is horizontally disposed.

7. In a freezer, the combination of an elongated container provided with a longitudinally extending bore and a removable cap at one end portion thereof, an agitator in said bore including a helical blade constructed and arranged to circulate the mix longitudinally of the container when said cap is in place, and force the mix out of said container when said cap is removed, and a disk-like auxiliary feed device provided with a peripheral portion of a size to engage said bore, and a slot to receive said helical blade, said auxiliary feed device constructed and arranged to scrape the frozen mix from the helical blade upon relative movement, one with respect to the other.

8. In a freezer, the combination of an elongated container provided with a longitudinally extending bore and a removable cap at one end portion thereof, an agitator in said bore including a helical blade constructed and arranged to circulate the mix longitudinally of the container when said cap is in place, and force the mix out of said container when said cap is removed, a disk-like auxiliary feed device provided with a peripheral portion of a size to engage said bore, and a slot to receive said helical blade, said auxiliary feed device constructed and arranged to scrape the frozen mix from the helical blade upon relative movement, one with respect to the other, and means for retaining said disk-like auxiliary feed device against rotation in said container.

LESTER N. YOHE.

REFERENCES CITED

The following references are of record in the file of this patent:

UNITED STATES PATENTS

| Number | Name | Date |
| --- | --- | --- |
| 954,951 | Furowitz | Apr. 12, 1910 |
| 970,369 | Greaves | Sept. 13, 1910 |
| 1,766,172 | Hiles | June 24, 1930 |
| 1,973,797 | Coulbourn | Sept. 18, 1934 |
| 1,998,692 | Van Rossem et al. | Apr. 23, 1935 |
| 2,268,905 | Schaub et al. | Jan. 6, 1942 |
| 2,302,169 | Baker | Nov. 17, 1942 |

FOREIGN PATENTS

| Number | Country | Date |
| --- | --- | --- |
| 122,518 | Germany | July 26, 1901 |
| 372,795 | Germany | Apr. 3, 1923 |